Oct. 16, 1928.
C. DAHL
1,687,715
FOOT POWER VEHICLE
Filed July 12, 1926
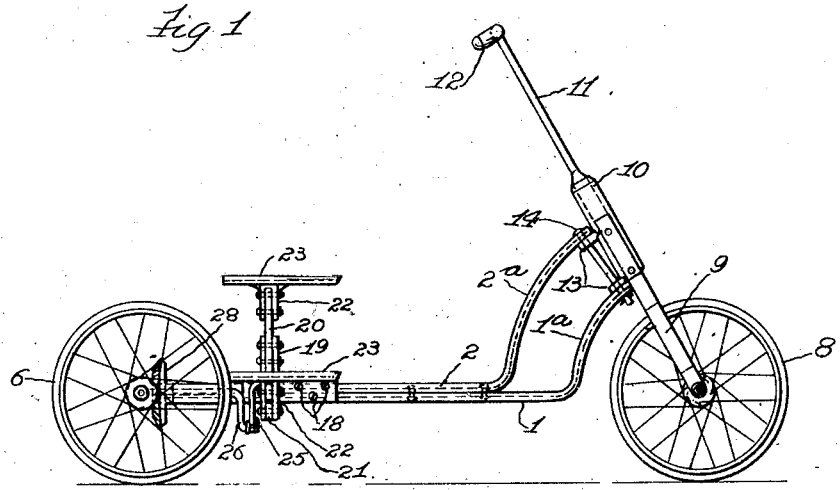
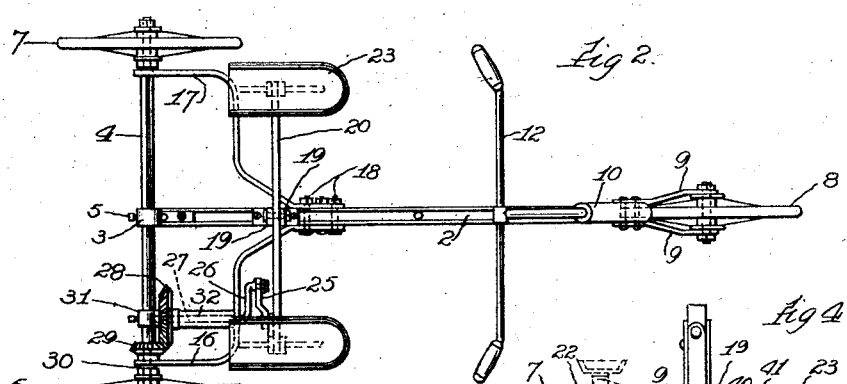
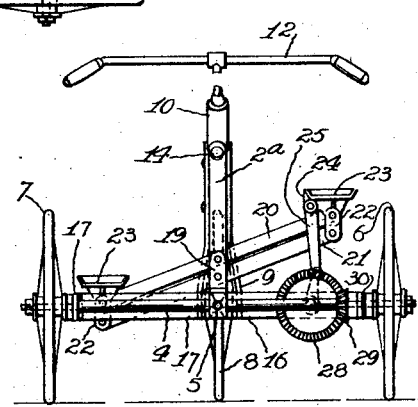
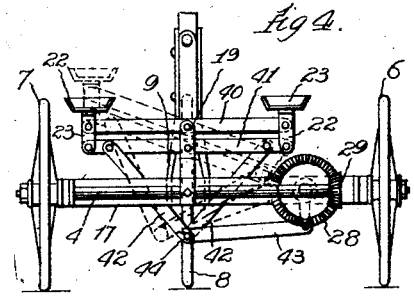
Inventor.
Conrod Dahl.
by Bunton & Bunton
his Attorneys.

Patented Oct. 16, 1928.

1,687,715

UNITED STATES PATENT OFFICE.

CONRAD DAHL, OF CHICAGO, ILLINOIS, ASSIGNOR, BY MESNE ASSIGNMENTS, OF ONE-HALF TO SAID CONRAD DAHL AND ONE-HALF TO EARL G. S. TRACY, OF COKATO, MINNESOTA.

FOOT-POWER VEHICLE.

Application filed July 12, 1926. Serial No. 121,763.

The purpose of this invention is to provide an improved vehicle, adapted to be propelled by the rider or occupant utilizing his weight largely for this purpose. As shown, the vehicle is designed to be operated by a single rider. The invention includes mechanism particularly designed for supporting the rider's weight, and at the same time transforming this force into the motion of vehicle travel while allowing the rider to maintain a comfortable position on the vehicle. This and other features of construction are hereinafter more fully described and shown in the drawings, while the novel combinations of elements are particularly pointed out in claims.

In the drawings:—

Figure 1 is a side elevation of a vehicle embodying this invention.

Figure 2 is a top plan view of the same.

Figure 3 is a rear elevation.

Figure 4 is a rear elevation showing a modified form of driving mechanism.

It may be understood that the vehicle shown in the drawings is designed primarily as a child's toy to be made in an appropriately small size, but that it may be adapted to larger sizes for use by adults if desired. The main frame is shown as composed of two steel channels, 1 and 2, riveted together and extending longitudinally between the front and rear wheels. At the rear a casting, 3, is attached to the frame members and itself embraces the stationary rear axle, 4, which is secured in the casting by means of a set screw, 5. The rear wheels, 6 and 7, are both rotatably mounted on the axle. A single front wheel, 8, is shown mounted in a fork, 9, extending downwardly from a hollow post, 10, in which the stem, 11, of the steering handle, 12, is secured. By means of lugs, 13, extending from the rear side of the post, 10, and a pivot pin, 14, passing through the lugs, the fork, 9, is hingedly connected to the upwardly bent ends, 1ª and 2ª, of the frame members to allow for steering movement of the front wheel, 8.

The frame is laterally braced against twisting by the provision of members, 16 and 17, which engage the axle, 4, just inside the wheels, 6 and 7, respectively, extending forwardly and thence inwardly for attachment to the main frame by clamping bolts, 18, at a point intermediate the front and rear axles. Just rearward of this connection of the frame members a pair of brackets, 19, rise from the upper frame member, 2, for pivotally supporting a transverse rocking member or "walking beam", 20, which is fulcrumed substantially at the middle of its length upon said brackets, 19. Directly below the lever, 20, a similar lever, 21, is likewise fulcrumed in the brackets, 19, extending parallel to the lever, 20, and said levers are connected at their ends by the up-standing stems, 22, of treadles, 23, adapted to support the feet of the rider. The rocking motion of the lever, 21, transmitted through the treadles by the rider shifting his weight from one foot to the other is utilized for driving the vehicle by providing a lug, 24, on one of the treadles from which a pitman, 25, extends to the crank, 26, of a short driving shaft, 27, carrying a beveled gear, 28. Said gear, 28, meshes with a bevel pinion, 29, suitably connected, as for example, through a driving sleeve 30 (not shown in detail) extending into the hub of the wheel, 6, so that power is transmitted to this wheel for propelling the vehicle while the wheel, 7, is allowed to run free on the axle, 4. A collar, 31, clamped to the axle, 4, provides a bearing for the rear end of the shaft, 27, while the forward end adjacent the crank, 26, is conveniently journaled in the transversely-extending portion of the frame member, 16. A spacer sleeve, 32, on the shaft holds the gear, 28, in place for meshing properly with its pinion, 29.

Figure 4 illustrates a slightly modified form of the drive mechanism in which the rocking lever members, 40 and 41, are shown provided with an operating member which is composed of bars, 42, attached to the lever, 41, near its ends respectively, and connected together at a point below the longitudinal frame members of the vehicle, thus constituting a rigid triangle which swings with the bar, 41, about its fulcrum. The pitman, 43, extends in approximately horizontal direction from the connecting pivot, 44, to the driving crank which operates the gear, 28, and through it the pinion, 29, in the same manner as in the mechanism of Figure 3. This arrangement, however, permits of a longer pitman and somewhat reduces the obliquity of the pitman in operation so that it is less likely to become blocked on "dead center" and thus allows a somewhat steadier driving action.

In both forms of the mechanism, it will be seen that the parallel relation of the rocking levers, 20 and 21 or 40 and 41, and the connection of the treadles thereto by means of the short stems or links which with the levers complete a parallelogram, insures that the treadles themselves will be maintained always in horizontal position if their initial position is horizontal,—or at all events, will travel so as to remain parallel to their initial positions. This is found to be more comfortable for the rider than when the treadles are allowed to tilt with the levers or are pivotally attached so that they are too easily tiltable on their pivotal mountings. Whereas the rigid treadles would require the rider's feet to resume uncomfortable positions in following their angular movements and pivoted pedals would result in some muscular strain to prevent the feet from tilting too freely about the pivots, I find that the horizontal treadles which are maintained in this position throughout their movements are always in a comfortable position for the rider and provide a more suitable support for his weight than the other forms. And by furnishing no other support for the rider's weight,—that is, by omitting any seat or saddle in the vehicle,—I insure that he will use his weight to the best advantage as a driving force without any unnecessary muscular exertion.

I claim:—

1. In a vehicle propelled by rider weight, a rocking lever fulcrumed between its ends, a pair of weight carrying platforms pivotally connected to the lever at opposite sides of its fulcrum respectively, guiding means for keeping each of said platforms substantially parallel to its initial position throughout the rocking movement of the lever and means for converting said rocking movement into vehicle travel.

2. In a vehicle propelled by rider weight, a lever extending transversely of the vehicle and fulcrumed between its ends for up and down rocking movement, a pair of weight carrying platforms connected to said lever at opposite sides of its fulcrum respectively, guiding means for keeping each of said platforms substantially parallel to its initial position throughout its up and down movement and means for converting the rocking movement of the lever into vehicle travel.

3. In a vehicle comprising a longitudinally extending frame member, a lever fulcrumed thereon and extending transversely of the frame member from both sides of its fulcrum, a pair of weight carrying platforms attached to the lever at opposite sides of said fulcrum respectively for supporting rider weight and adapted for limited up and down movement laterally with respect to each other for rocking the lever, together with means for transmitting said rocking movement to one wheel of the vehicle for driving the same.

4. In a vehicle propelled by rider weight, a pair of parallel levers fulcrumed between their ends for vertical rocking movement and extending transversely of the vehicle, a pair of parallel links connecting said levers together, a pair of weight carrying platforms rigidly attached to said links respectively at opposite sides of the lever fulcrums and means for converting the rocking lever movement into vehicle travel.

5. In a vehicle propelled by rider weight, a rocking lever fulcrumed between its ends extending transversely of the vehicle, a pair of weight carrying platforms connected to the lever at opposite sides of its fulcrum respectively for up and down movement therewith, guiding means for keeping each of said platforms substantially parallel to its initial position throughout such movement, a crank, a pitman connecting the crank with said rocking lever and bevel gearing for transmitting the rotation of the crank to a drive wheel of the vehicle.

6. In a vehicle comprising a longitudinally extending frame member, a transverse lever fulcrumed between its ends above said frame member and supported thereon, a pair of treadles pivotally connected to the lever at opposite sides of its fulcrum with guiding means for keeping each of said treadles substantially parallel to its initial position throughout the rocking movement of the lever upon its fulcrum and means for converting said rocking movement into vehicle travel comprising an operating member composed of a pair of links attached to the lever at opposite sides of its fulcrum and extending obliquely downward to a point of connection below said frame member, a substantially horizontal pitman attached to said bell crank, a crank shaft arranged to be driven by the pitman and gearing connecting the crank shaft with one of the vehicle wheels for driving it.

7. In a vehicle propelled by rider weight, a lever fulcrumed between its ends for vertical rocking movement and extending transversely of the vehicle, a pair of weight carrying platforms connected to the lever at opposite sides of its fulcrum respectively, guiding means for keeping each of said platforms parallel to its initial position throughout the rocking lever movement, an operating member on the lever swinging in a substantially vertical plane, an approximately horizontal pitman and a crank connected to the operating member by said pitman, together with drive gearing for transmitting motion from the crank to the wheel of the vehicle.

8. A vehicle comprising a longitudinally extending frame member, a steering wheel to which the frame is connected at the forward end, a fixed axle secured to the rear end of the frame with a pair of wheels thereon, bracket means on the frame intermediate the front and rear wheels, a pair of transverse levers fulcrumed between their ends on the bracket, one above the other, for rocking movement in a vertical plane, parallel links connecting said levers in parallel relation to each other, a pair of treadles rigidly supported by said links and thereby maintained substantially parallel to their initial positions throughout the rocking movement of the levers, a bevel pinion operatively connected to one of the rear wheels, a bevel gear meshing therewith and carried on a crank shaft journaled in the frame and a pitman operatively connecting the crank shaft with the rocking levers.

9. In the combination defined in claim 8, means constituting an operating member on one of the rocking levers pivotally connected to the pitman directly below the lever fulcrums, said pitman extending in approximately horizontal direction to the wrist pin of the crank shaft.

10. In the combination defined in claim 8, the rocking levers being fulcrumed above the frame member and an operating member formed on one of them by links attached respectively to the lever at opposite sides of its fulcrum and extending downward to a connecting pivot below the frame, said links engaging opposite faces of the lever at their upper ends and embracing the pitman between them at their common pivot below the frame, said pitman extending laterally from said pivot to the wrist pin of the crank shaft.

11. In a rider-weight propelled vehicle, a wheeled frame, a rocking lever pivoted thereon and disposed transversely of the line of travel of the vehicle, a weight platform at either end of the lever and power transmission means connected between the lever and the vehicle wheels whereby the rocking movement of the lever serves to drive the vehicle.

CONRAD DAHL.